March 5, 1963  A. H. KENT  3,080,017
ENERGY STORING MEANS
Filed Jan. 6, 1961
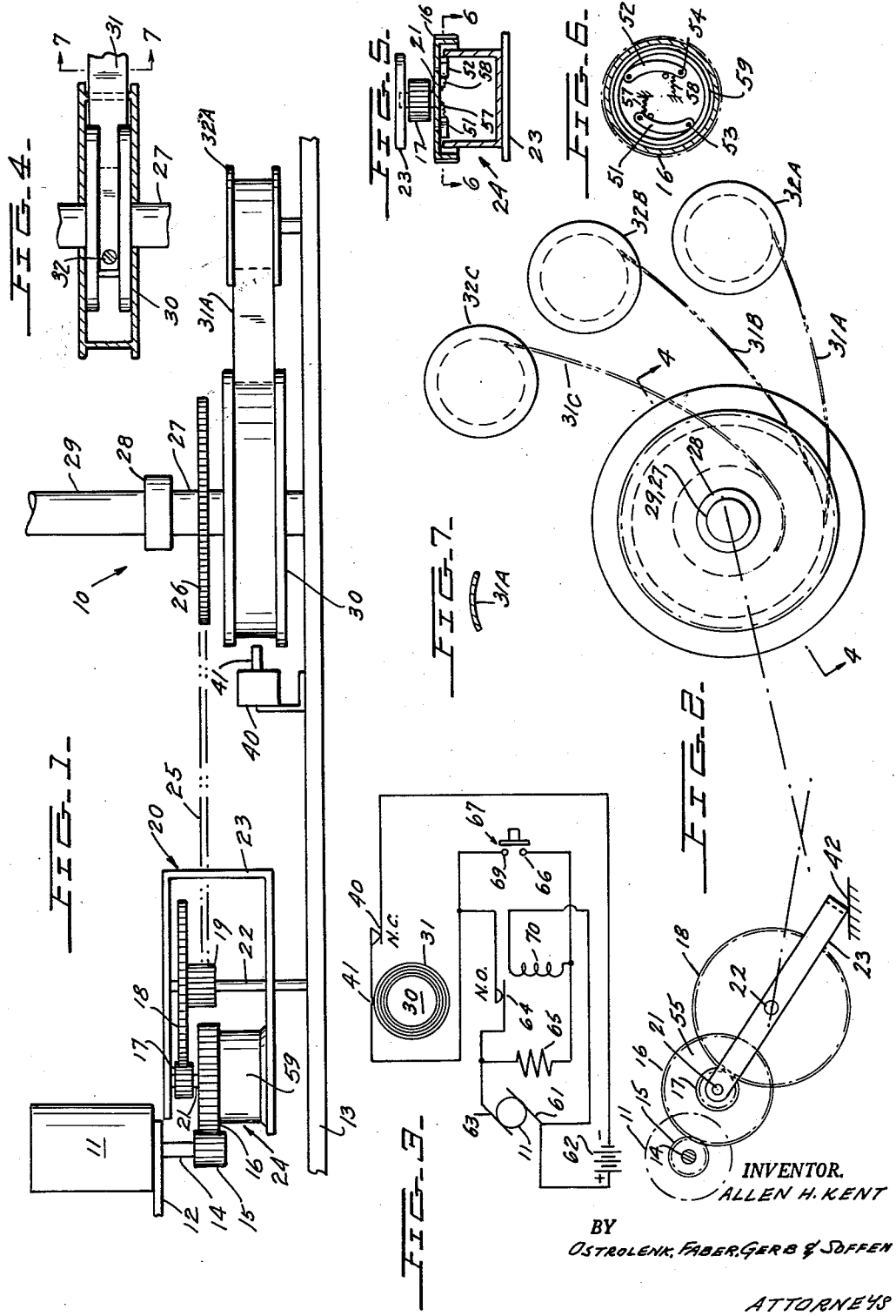
INVENTOR.
ALLEN H. KENT
BY
OSTROLENK, FABER, GERB & SOFFEN
ATTORNEYS United States Patent Office 3,080,017
Patented Mar. 5, 1963

3,080,017
ENERGY STORING MEANS
Allen H. Kent, New York, N.Y., assignor, by mesne assignments, to Landers, Frary & Clark, New Britain, Conn., a corporation of Connecticut
Filed Jan. 6, 1961, Ser. No. 81,059
15 Claims. (Cl. 185—40)

This invention relates to means for storing mechanical energy, with the means being dischargeable over an extended period of time with a substantially constant force output.

Certain motor operated devices require extremely large starting torques or are operated for only short periods of time at infrequent intervals. If these devices are operated directly by an electric motor, this motor must be capable of delivering an output in excess of the maximum normal operating demand. Thus, a motor of high rating must be utilized even though most of the motor operation will take place under extremely light loads.

For some applications a battery source is utilized to energize the motor. If a heavy load is placed upon the motor the high starting torque necessary to overcome this heavy load requires the battery to deliver high peak currents on starting.

Most commercial grade batteries are capable of delivering considerable energy over an extended period of time. However, because of internal resistance, the batteries are not capable of delivering relatively high currents for even a short period of time.

This invention provides means whereby a motor of low rating acting through speed reduction gearing charges a spring means with the charging interval being quite long. Energy stored in the spring means is then dischargeable on demand over an interval of time controllable by speed governor means. In the instant invention a concentrically wound coil spring of cross curvature is utilized so that the stored energy is discharged with a constant force. A spring of this type is known in the art as a NEG 'ATOR spring, which is a trademark designation of the American Machine & Metals Company.

The energy stored in the spring, since it is released over an extended period of time, can, for example, be utilized to drive a pencil sharpening device of the type illustrated in my copending application (M-614) Serial No. 833,065, filed August 11, 1959, now Patent No. 3,004,522 issued October 17, 1961, or can be utilized to assist the drive motor for an air conditioning compressor on starting of the compressor. In both of these types of application it is to be noted that the storage device will be called upon infrequently to deliver power during periods of time which are extremely small as compared with the time available for charging of the storage means.

Accordingly, a primary object of this invention is to provide a novel construction for a mechanical energy storage device.

Another object is to provide a novel construction for a mechanical energy storage device which produces a constant force output over an extended time interval.

Still another object is to provide an energy storage device which includes holding means for retaining a storage spring in its energized condition with this holding means being a result of back torque exerted by the spring on a speed reduction gear unit.

A further object is to provide a novel construction for an energy storage means in combination with an electric motor for charging the storage means.

These as well as other objects of this invention shall become readily apparent after reading the following description of the accompanying drawings in which:

FIGURE 1 is a side elevation of a device constructed in accordance with the teachings of the instant invention.

FIGURE 2 is a plan view of the device of FIGURE 1.

FIGURE 3 is an electrical schematic of the device of FIGURE 2.

FIGURE 4 is a cross-section of one of the spring reels taken through line 4—4 of FIGURE 2 looking in the direction of arrows 4—4.

FIGURE 5 is a longitudinal cross-section of the speed governor portion of the device.

FIGURE 6 is a cross-section taken through line 6—6 of FIGURE 5 looking in the direction of arrows 6—6.

FIGURE 7 is a showing of a length of one of the springs in relaxed condition.

Now referring to the figures, device 10 is constructed to store mechanical energy and produce a constant force output over an extended interval of time. Charging of device 10 is brought about by motor 11 mounted to bracket 12 which extends upwardly from base 13. Output shaft 14 of motor 11 is provided with pinion spur gear 15 comprising one of the plurality of gears 15-19 of speed reduction gear unit 20.

Gears 16 and 17 are keyed to shaft 21 with gear 17 being in driving enagement with gear 18. Gears 18 and 19 are keyed to each other and are rotatably mounted to shaft 22 which extends upwardly from base 13.

Gear unit 20 also includes a C-shaped carrier 23 pivotally mounted to shaft 22 for a purpose to be hereinafter explained, and further includes a speed governor 24 whose function will also be hereinafter explained. Output gear 19 is connected through chain 25 to gear 26 keyed to stub shaft 27. One-way over-running clutch device 28, of a type well known to the art, connects shaft 27 to output shaft 29 which is adapted to be connected to any apparatus desired to be driven by device 10. Reel 30 is also keyed to shaft 27.

One end of spring means 31 is connected at 32 to reel 30. In the embodiment illustrated spring means 31 actually comprises three coil springs 31A, 31B and 31C, connected to individual spools 32A, 32B and 32C, respectively. As is apparent, springs 31A-31C are interleaved when wound upon reel 30. In their relaxed condition, springs 31A-31C are wound upon their respective spools 32A-32C.

In operation, spring means 31 is charged by energizing motor 11 so that output shaft 14 rotates in the appropriate direction to cause a clockwise rotation of reel 30 with respect to FIGURE 2. This winds spring means 31 upon reel 30 until such time as the plunger 41 of normally closed microswitch 40 is engaged by spring means 31. This deenergizes motor 11, as will be more fully explained hereinafter, and at this time substantially all of spring means 31 is wound upon reel 30 so that spring means 31 is in a loaded condition.

Spring means 31 now exerts a force which tends to rotate stub shaft 27 counterclockwise with respect to FIGURE 2. This in turn exerts a force tending to rotate carrier 23 clockwise about shaft 22, thereby maintaining input gear 16 in operative engagement with motor pinion 15. The back torque resulting from the proportions of gears 15-19 maintains shaft 27 against clockwise rotation with carrier 23 abutting stop 42.

In order to release the energy stored in spring means 31, carrier 23 is rotated counterclockwise about shaft 22 until gear 16 disengages from gear 15. The proportions of gears 15-19 are such that at this time the counterclockwise rotation of shaft 27 is not prevented, so that it may rotate counterclockwise under the influence of spring means 31 and, acting through clutch means 28, will drive output shaft 29.

Each of the springs 31A-31C is a concentrically wound coil of ribbon-like material having a cross-curvature, as illustrated in FIGURE 7. With this construction there is always a constant force tending to return springs 31A-31C to their respective spools 32A-32C, so that a constant force is exerted upon shaft 27. Since the total spring layer on reel 30 is small as compared with the lever arm, a substantially constant torque is exerted upon shaft 27 as springs 31A-31C return to spools 32A-32C.

Governor device 24 is constructed to limit the speed of shaft 27 to a predetermined value. If the speed of shaft 27 becomes too great, friction arms 51, 52, pivoted at 53, 54, respectively, to the housing 55 of gear 16, move outwardly against the force of biasing springs 57, 58, respectively, into engagement with the internal surface of drum 59. Drum 59 is fixedly mounted to carrier 23. The forces necessary to overcome the frictional engagement between arms 51, 52 and drum 59 cause the speed of shaft 27 to be reduced so that this speed does not exceed a predetermined value.

Now referring more particularly to FIGURE 3. Motor terminal 61 is connected directly to the positive terminal of battery 62, while the other terminal 63 of motor 11 is connected directly to one of the contacts of normally open switch 64 and is connected through resistor 65 to terminal 66 of charging switch 67. The other terminal 69 of switch 67 is connected to switch 64 and also to microswitch 40 which, in turn, is connected to the negative terminal of battery 62. The normally open switch 64 is closed through the energization of coil 70, connected from the positive terminal of battery 62 to switch terminal 66.

Charging of device 10 is accomplished by momentarily closing switch 67. This energizes coil 70 closing switch 64 to complete a circuit through microswitch 40 to energize motor 11. The rotation of motor 11 is effective to wind spring means 31 upon reel 30 until such time as spring means 31 engages pin 41 to open microswitch 40 and interrupt the energizing circuit of motor 11. After the opening of switch 67, resistor 65 is connected in series with coil 70 across battery 62, so that only the reduced current required for the holding of contacts 64 is applied to coil 70.

Thereafter, counterclockwise rotation of gear carrier 23 permits springs 31A-31C to return to their respective spools 32A-32C. In so doing springs 31A-31C exert a substantially constant force which produces a uniform torque at shaft 27 over an extended time interval whose minimum duration is determined by speed governor 24.

The one-way overrunning clutch 28 permits shaft 27 to drive shaft 29 only counterclockwise with respect to FIGURE 2. In addition shaft 29 may have a faster speed of rotation than shaft 27 when the former is driven by means in addition to power supplied through shaft 27.

Although there has been described preferred embodiments of this invention, many variations and modifications will now be evident to those skilled in the art and, therefore, the scope of this invention is to be limited not by the specific disclosure herein detailed, but only by the appended claims.

I claim:
1. A mechanical energy storage device for producing a constant force output over an extended time interval, said device comprising first and second reels, a concentrically wound coil of cross-curvature connected between said reels and tensioned so as to normally be on said first reel, a charging means including a motor and a gear unit constructed so that the speed of its output shaft is considerably less than the speed of its input shaft; means connecting said motor to said input shaft for driving of said gear unit; means connecting said output shaft to said second reel for rotation thereof in a first direction by said motor whereby said spring is transferred to said second reel and thereby loaded; holding means for retaining said spring on said second reel; means for releasing said holding means to permit said spring to return to said first reel and in so doing rotate said second reel in a second direction opposite to said first direction.

2. The device set forth in claim 1 in which the gear unit comprises a carrier and a plurality of gears including an input gear mounted thereto; a driving gear driven by said motor; said carrier being mounted for movement whereby said input gear is movable into and out of engagement with said driving gear; said plurality of gears and said driving gear being proportioned and arranged so that said spring does not exert sufficient force to rotate said second reel in said second direction unless said driving and input gears are disengaged.

3. The device set forth in claim 2 in which the spring exerts a force biasing on said gear unit urging said input gear into engagement with said driving gear.

4. The device set forth in claim 1 also including a governor device connected to a gear of said gear unit to limit to a predetermined value the rotational speed of said second reel in said second direction.

5. The device set forth in claim 4 in which the governor device comprises a centrifugal friction means.

6. The device set forth in claim 1 in which the holding means is a result of back torque exerted by the charging means when the gear unit and motor thereof are operatively connected.

7. A mechanical energy storage device for producing a constant force output over an extended time interval said device comprising a reel means, a reel, a concentrically wound coil spring means of cross-curvature connected between said reel and said reel means and tensioned so as to normally be on said reel for rotation thereof in a first direction by said motor whereby said spring means is transferred to said reel and thereby loaded; holding means for retaining said spring means on said reel; means for releasing said holding means to permit said spring means to return to said reel means and in so doing rotate said reel in a second direction opposite to said first direction; said reel means comprising a plurality of spools; said spring means comprising a plurality of springs, one for each of said spools.

8. The device set forth in claim 7 in which the gear unit comprises a carrier and a plurality of gears including an input gear mounted thereto; a driving gear driven by said motor; said carrier being mounted for movement whereby said input gear is movable into and out of engagement with said driving gear; said plurality of gears and said driving gear being proportioned and arranged so that said spring means does not exert sufficient force to rotate said second reel in said second direction unless said driving and input gears are disengaged.

9. The device set forth in claim 8 in which the spring means exerts a force biasing on said gear unit urging said input gear into engagement with said driving gear.

10. The device set forth in claim 9 also including a governor device connected to a gear of said gear unit to limit to a predetermined value the rotational speed of said second reel in said second direction.

11. The device set forth in claim 7 in which the reel comprises a single spool which receives said plurality of spring in concentric interleaved relationship.

12. The device set forth in claim 7 in which the holding means is a result of back torque exerted by the charging means when the gear unit and motor thereof are operatively connected.

13. A mechanical energy storage device for producing a force output over an extended time interval, said device comprising a reel means, a reel, a spring means connected between said reel and said reel means, a charging means including a motor and a gear unit constructed so that the speed of its output shaft is considerably less than the speed of its input shaft; means connecting said motor to said input shaft for driving of said gear unit; means connecting said output shaft to said reel for rotation thereof in a first direction by said motor whereby said spring means is transferred to said reel and thereby loaded;

holding means for retaining said spring means on said reel; means for releasing said holding means to permit said spring means to return to said reel means and in so doing rotate said reel in a second direction opposite to said first direction; said gear unit comprising a carrier and a plurality of gears including an input gear mounted thereto; a driving gear driven by said motor; said carrier being mounted for movement whereby said input gear is movable into and out of engagement with said driving gear; said plurality of gears and said driving gear being proportioned and arranged so that said spring means does not exert sufficient force to rotate said second reel in said second direction unless said driving and input gears are disengaged.

14. The device set forth in claim 13 in which the spring means exerts a force biasing on said gear unit urging said input gear into engagement with said driving gear.

15. The device set forth in claim 14 also including a governor device connected to a gear of said gear unit to limit to a predetermined value the rotational speed of said second reel in said second direction.

References Cited in the file of this patent
UNITED STATES PATENTS

| | | |
|---|---|---|
| 1,082,302 | Carlin | Dec. 23, 1913 |
| 2,759,561 | Bolsey | Aug. 21, 1956 |
| 2,904,956 | Zenor | Sept. 22, 1959 |